(12) United States Patent
Choi

(10) Patent No.: US 7,688,773 B2
(45) Date of Patent: Mar. 30, 2010

(54) METHOD OF TRANSMITTING AND RECEIVING A SIGNAL IN AN MC-CDMA SYSTEM

(75) Inventor: Hokyu Choi, Middlesex (GB)

(73) Assignee: Samsung Electronics (UK) Ltd (GB)

( * ) Notice: Subject to any disclaimer, the term of this patent is extended or adjusted under 35 U.S.C. 154(b) by 1126 days.

(21) Appl. No.: 11/323,873

(22) Filed: Dec. 29, 2005

(65) Prior Publication Data

US 2006/0171424 A1    Aug. 3, 2006

(30) Foreign Application Priority Data

Dec. 29, 2004  (GB)  ................................. 0428457.6

(51) Int. Cl.
H04B 7/00  (2006.01)

(52) U.S. Cl. ........................ 370/320; 370/335; 370/342; 370/441

(58) Field of Classification Search ................. 370/319, 370/320, 335, 342, 441
See application file for complete search history.

(56) References Cited

U.S. PATENT DOCUMENTS

| | | | | |
|---|---|---|---|---|
| 6,643,333 | B1 * | 11/2003 | Berens et al. | 370/342 |
| 6,810,030 | B1 * | 10/2004 | Kuo | 370/335 |
| 7,035,201 | B2 * | 4/2006 | Fu et al. | 370/335 |

* cited by examiner

Primary Examiner—Ricky Ngo
Assistant Examiner—Pao Sinkantarakorn
(74) Attorney, Agent, or Firm—The Farrell Law Firm, LLP

(57) ABSTRACT

A method of transmitting a signal formed from data symbols over a wireless communication link in a multi carrier code division multiple access communication system, in which the data symbols are spread over multiple sub-carriers in accordance with a code of predetermined length, comprising the steps of: allocating the bandwidth available for use by the system into a plurality of sub carrier frequency groups, demultiplexing the signal into a first set of data symbols to be spread over a first group of sub carrier frequencies, and demultiplexing the signal into a second set of data symbols to be spread over a second group of sub carrier frequencies.

26 Claims, 6 Drawing Sheets

METHOD OF TRANSMITTING AND RECEIVING A SIGNAL IN AN MC-CDMA SYSTEM

PRIORITY

This application claims priority under 35 U.S.C. §119 to a patent application filed in the United Kingdom Intellectual Property Office on Dec. 29, 2004, which was assigned Serial No. 0428457.6.

BACKGROUND OF THE INVENTION

1. Field of the Invention

The present invention relates to improvements in multi-carrier code division multiple access (MC-CDMA) communication systems, and in particular to an improved method of transmitting and receiving data, wherein data bits or modulation symbols are spread over multiple sub-carriers in accordance with a code of predetermined length.

2. Description of the Related Art

In wireless communication systems, a series of transmitted signals are replicated and received at the receiver. These signals have different delays, amplitudes and phases along various paths due to the neighbouring environment. The superposition of these received signals causes amplitude and phase variations. This is called multi-path fading, and causes signal degradation and inter-symbol interference due to the delayed signals overlapping with following symbols.

In OFDM systems different data symbols are transmitted over different sub-carriers with symbol durations longer than the original symbol due to the serial to parallel operation. The degree of inter-symbol interference caused by multi-path fading is reduced as the symbol duration increases. In addition, an added cyclic prefix in OFDM symbols enables the receiver to remove inter-symbol interference and recover the orthogonality of sub-carrier signals.

An alternative method of reducing multi-path distortion is to use a multiple number of frequency carriers, or multi-carriers (MC), to send each data bit or symbol, thus providing an increased chance that data within one of the sub carriers is successfully received.

However, in the above communication systems, if other users apply the same method, distortion can result due to the interference of two different signals being transmitted at the same sub frequency. This has resulted in the development of Multi-Carrier Coded Division Multiple Access (MC-CDMA).

In MC-CDMA, a unique code is allocated to each user of the system. The code is orthogonal, or non-overlapping, so that each code does not interfere with any other code. The code is applied to each data bit or symbol at the transmitter end in order to spread it over the useable frequency bandwidth. In MC-CDMA systems, the spreading factor is the number of frequency sub-carriers over which a data signal is spread. Therefore, the length of the code determines the spreading factor, or processing gain.

FIG. 1 shows a known MC-CDMA transmitter block diagram where the length of the spreading code (processing gain) is equivalent to the number of useable frequency sub-carriers. A data stream 101 for one user is indicated. The data stream comprises data symbols 103, and is applied to the input of a de-multiplexer 105. Each symbol 103 has a pre-determined orthogonal code 109 applied to it 107 in order to spread the data symbol 103 over the available transmission bandwidth. After a pre-determined number of symbols, which is equivalent to the number of useable frequency sub-carriers, have been spread by a unique spreading code, they are summed together by the summing circuitry 115. The output of the summer 115 is converted from serial to parallel using the serial to parallel converter 117. The outputs of the serial to parallel converter 117 are applied to the input of an Inverse Fast Fourier Transform (IFFT) processor 119. The frequency bandwidth over which the data symbols have been spread is indicated by 113 in FIG. 1. The IFFT converts the frequency domain signal into a time domain signal, which is then converted from a parallel to serial signal using the parallel to serial converter 121. The transmitter aerial 123 then transmits the signal.

Guard bands are provided in the system to minimise interference of the transmission frequency range with other frequency ranges that are allocated for other purposes. Therefore, the input of the IFFT 119 has null points 118 set at the top and bottom of the available frequency bandwidth being used. The null area is usually set at 25% of the total available bandwidth, with 12.5% at the top of the frequency range and 12.5% at the bottom of the frequency range.

The example shown in FIG. 1 corresponds to the case where the spreading factor is equivalent to the number of useable frequency sub-carriers. However, if there are a large number of frequency sub-carriers, this can be unrealistic because the spreading factor is proportional to the receiver complexity. In order to reduce the complexity of the receiver, additional de-multiplexing of the data stream being transmitted is required to reduce spreading factor.

De-multiplexing is also required to match the number of useable frequency sub-carriers to an integer multiple of the spreading factor. The length of the IFFT is equal to the number of total sub carriers, and is a number equal to $2^m$, where m is an integer. The spreading factor is a number equal to $2^n$, where n is an integer. The number of useable frequency sub-carriers is equal to 75% of the IFFT length due to the null points in the guard bands. A problem therefore arises, as 75% of $2^m$ does not fit to the spreading factor $2^n$.

An example is given taking the case where the IFFT length is set at 1024 ($2^{10}$). This means the number of useable sub-carriers is equal to 75% of this length, i.e. 768. As the spreading factor is a number equal to $2^n$, where n is an integer, in order to provide orthogonality the spreading factor needs to be decreased to a value at least equal to 512, and so a third of the useable sub-carriers are not used. In order to make full use of the useable frequency sub-carriers, data symbols need to be de-multiplexed appropriately.

The same problems are associated with the FFT inputs at the transmitter end of the system.

SUMMARY OF THE INVENTION

The present invention aims to overcome or at least alleviate some or all of the aforementioned problems. For example, the present invention aims to improve system performance over the prior art where input data symbols are de-multiplexed into multiple streams for use with a smaller spreading factor.

In one aspect, the present invention provides a method of transmitting a signal formed from data symbols over a wireless communication link in a multi carrier code division multiple access communication system, in which the data symbols are spread over multiple sub-carriers in accordance with a code of predetermined length, comprising the steps of: allocating the bandwidth available for use by the system into a plurality of sub carrier frequency groups, de-multiplexing the signal into a first set of data symbols to be spread over a first group of sub carrier frequencies, and de-multiplexing the signal into a second set of data symbols to be spread over a second group of sub carrier frequencies.

In another aspect, the present invention provides a method of receiving a signal formed from data symbols over a wireless communication link in a multi carrier code division multiple access communication system, in which the data symbols are spread over a plurality of said carriers in accordance with a code of predetermined length, comprising the steps of: dividing the received signal into a plurality of sub carrier frequency groups, de-spreading a first group of sub carrier frequencies into a first set of data symbols, de-spreading a second group of sub carrier frequencies into a second set of data symbols, and multiplexing the sets of data symbols to form a data stream.

The present invention provides the advantage of maximising the use of the available bandwidth in a MC-CDMA communications system.

The present invention provides the advantage of allowing certain pre-determined bits to have higher priority than other bits. In particular, it provides the advantage of applying a larger spreading code to certain pre-determined bits or symbols in order to increase the chances of successful transmission of those pre-determined bits or symbols.

In one aspect of the present invention the advantage of dynamically switching between equal and unequal spreading depending on the number of modulation data symbols is provided.

BRIEF DESCRIPTION OF THE DRAWINGS

Specific embodiments of the present invention will now be described by way of example only, with reference to the accompanying drawings, in which.

DETAILED DESCRIPTION OF EMBODIMENTS OF THE INVENTION

First Embodiment

Figure 1:
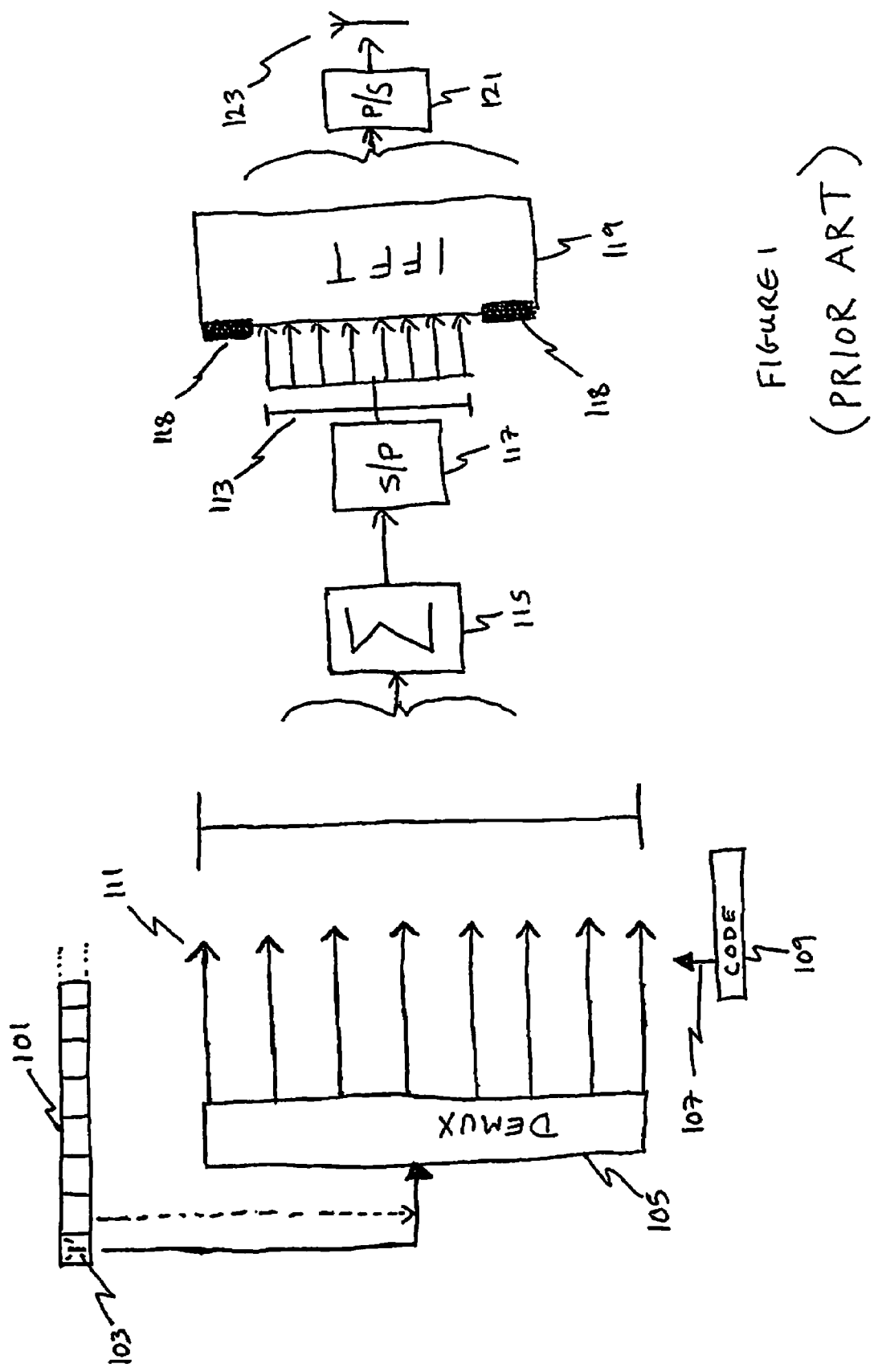
FIG. 1 shows a known MC-CDMA transmitter block diagram.
Figure 2:
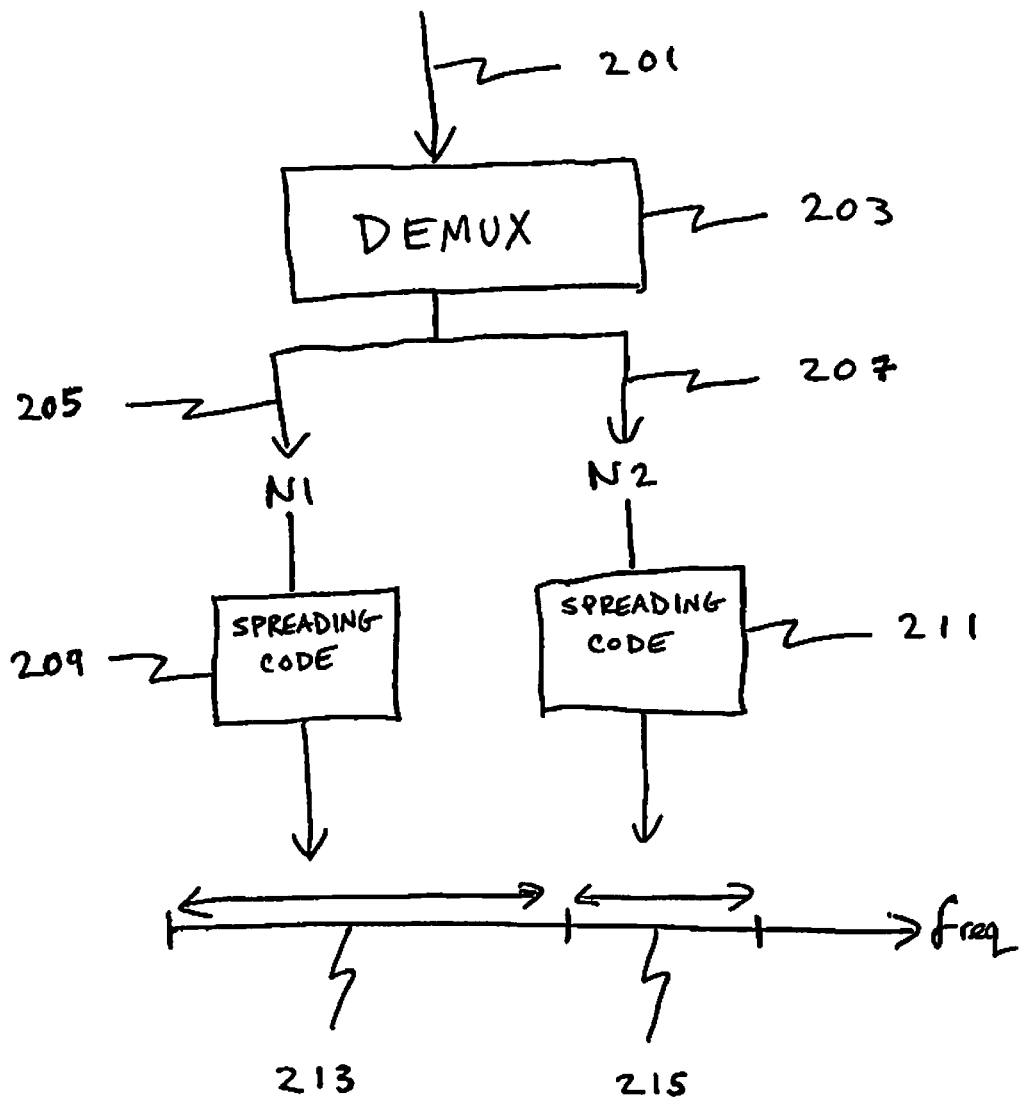
FIG. 2 shows a block diagram of a spreading concept according to a first embodiment of the present invention.

FIG. 2 shows a high rate data stream 201 being applied to a de-multiplexer 203. The output of the de-multiplexer 203 is split between two different channels, a first channel (N1) 205 and a second channel (N2) 207. That is, data bits or symbols within the input data stream 201 are separated, and subsequently have a different orthogonal code applied depending on which channel (205 or 207) they are allocated to. In the first channel 205, a first spreading code 209 is applied to the data bits or symbols. In the second channel 207, a second spreading code 211 is applied to the data bits or symbols.

This method results in a first set of data bits or symbols within the data stream being spread over a first range of frequency sub carriers 213, and a second set of data bits or symbols within the data stream being spread over a second range of frequency sub-carriers 215.

Therefore, more of the useable sub carriers may be utilised by the system thus avoiding any wasted bandwidth. For example, instead of leaving the 256 sub carriers unused as described in the introduction, a second spreading code of length 256 ($2^8$) may be applied to a selected portion of bits or symbols in the data stream in order to maximise performance. All 768 useable sub carriers are used, with 512 being used by a first spreading code, and the remaining 256 being used by a second spreading code.

Figure 3:
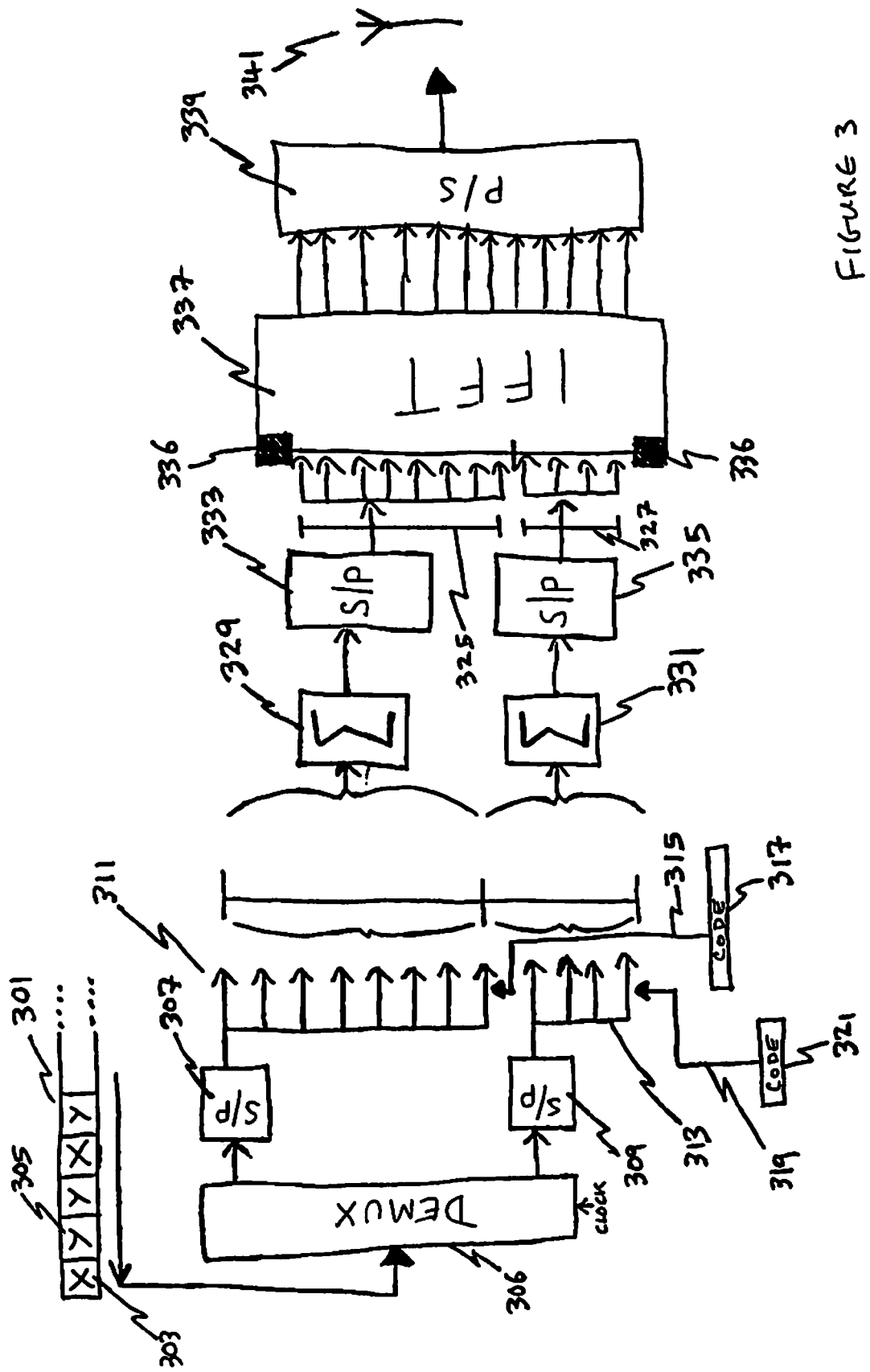
FIG. 3 shows a block diagram of a transmitter according to an embodiment of the present invention.

A block diagram of a transmitter according to this first embodiment is shown in FIG. 3. An input data stream 301 includes a first type of data symbol 'X' 303, and a second type of data symbol 'Y' 305. These data symbols are applied to a de-multiplexer 306. The de-multiplexer 306 includes a clock input, where a clocking signal is applied at a pre-determined rate. This allows each of the different types of data symbol ('X' and 'Y') to be switched onto different outputs using known timing logic (not shown). In this example, a first symbol is sent to a first serial to parallel converter 307, while the next two symbols are sent to a second serial to parallel converter 309. This process then repeats itself.

The first serial to parallel converter 307, in combination with a first group of spreading codes 317, spreads the incoming data symbol over a first branch 311. The arrow 315 indicates the application of the first group of spreading codes 317 to branch 311 coming out of the serial to parallel converter 307. The second serial to parallel converter 309, in combination with a second group of spreading codes 321, spreads the next sequential incoming data symbol over a second branch 313. The arrow 319 indicates the application of the second group of spreading codes 321 to branch 311 coming out of the serial to parallel converter 309.

Therefore, a first group of coded symbols 311 are allocated to an upper frequency band range 325 of the available bandwidth 323, while a second group of coded symbols 313 are allocated to a lower frequency band range 327 of the available bandwidth.

The upper signal group 311 are summed together by a first summing circuit 329. The output of the first summing circuit 329 is applied to a third serial to parallel converter 333. The lower signal group 313 is summed together by a second summing circuit 331. The output of the second summing circuit 331 is applied to a fourth serial to parallel converter 335.

The output of the third serial to parallel converter 333 is applied to one group of the IFFT 337 inputs, while the output of the fourth serial to parallel converter 335 is applied to another group of IFFT 337 inputs. Null points 336 are shown at the top and bottom of the IFFT inputs, for the reasons discussed in the introduction.

The output of the IFFT 337 is applied to a parallel to serial converter 339 allowing the data to be transmitted using a transmission aerial 341.

Figure 4:
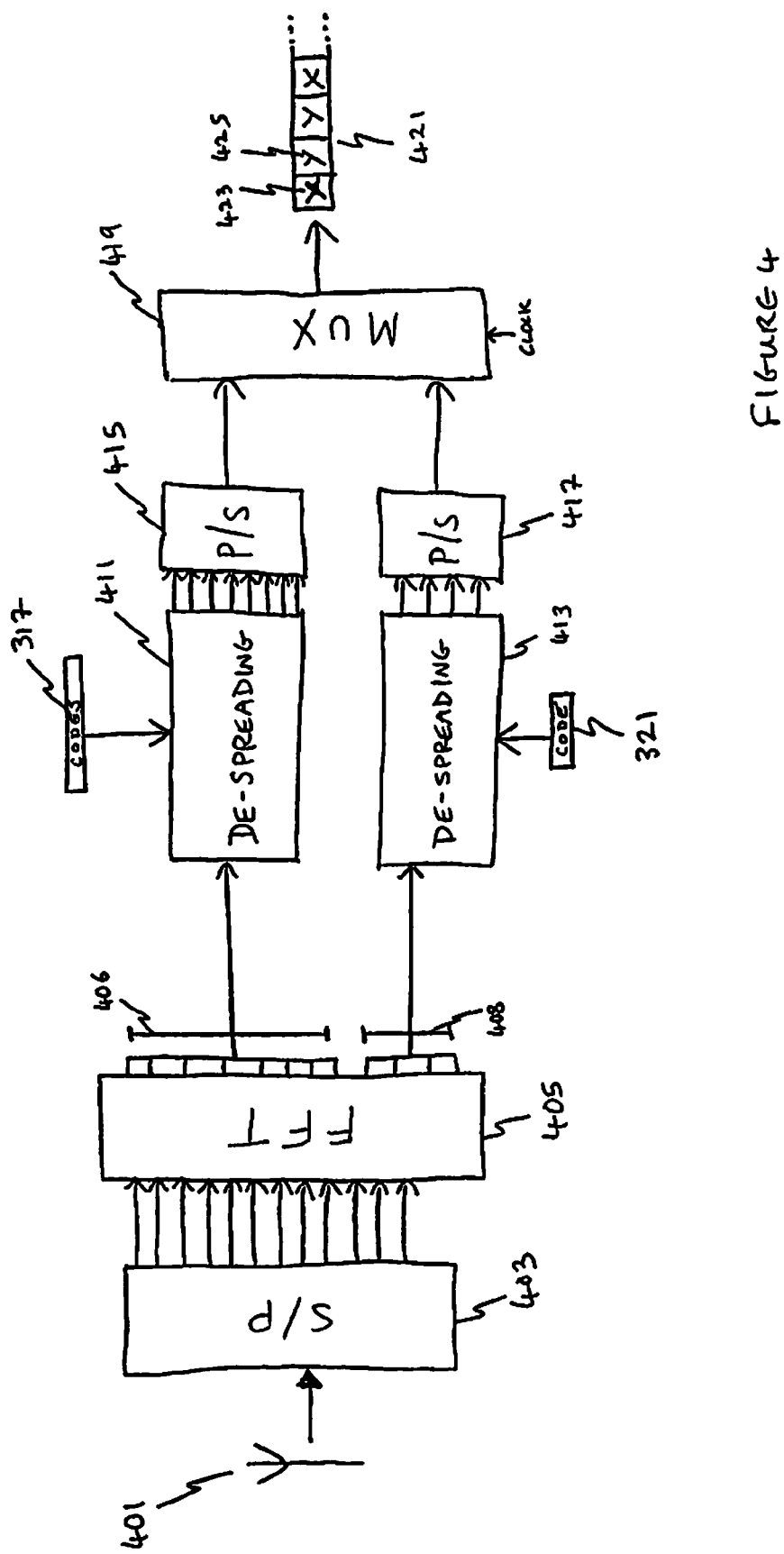
FIG. 4 shows a block diagram of a receiver according to an embodiment of the present invention.

FIG. 4 shows a block diagram of a receiver according to this embodiment.

A receiver aerial 401 picks up the radio signals being transmitted and inputs them into a serial to parallel converter 403. The parallel outputs are applied to a FFT 405 to convert them into the frequency domain. A first group of sub carrier frequencies 406 is applied to a first de-spreading circuit 411, while a second group of sub carrier frequencies is applied to a second de-spreading circuit 413.

The first group of spreading codes 317, the same as used in the transmitter previously described, is applied to the first de-spreading circuit 411. The second group of spreading codes 321, the same as used in the transmitter previously described, is applied to the second de-spreading circuit 413.

Each spreading code, 317 and 321, is applied to its respective de-spreading circuit, 411 and 413, separately. As the codes used in the receiver are the same as the codes used in the transmitter, the data can be reconstructed.

The outputs of the first de-spreading circuit 411 are applied to a third parallel to serial converter 415, and the outputs of the second de-spreading circuit 413 are applied to a fourth parallel to serial converter 417. The outputs of each of the third and fourth serial to parallel converters (415 and 417) are applied to a multiplexer 419. The multiplexer uses suitable timing logic (not shown), as would be known in the art, and a clock input, in order to provide an output data stream 421 comprising the data symbol types 'X' and 'Y' (423 and 425).

Therefore, it is possible to selectively choose which data symbols have which spreading code applied to them in order to determine in which group of sub carrier frequencies the data symbols are transmitted.

Second Embodiment

Figure 5:
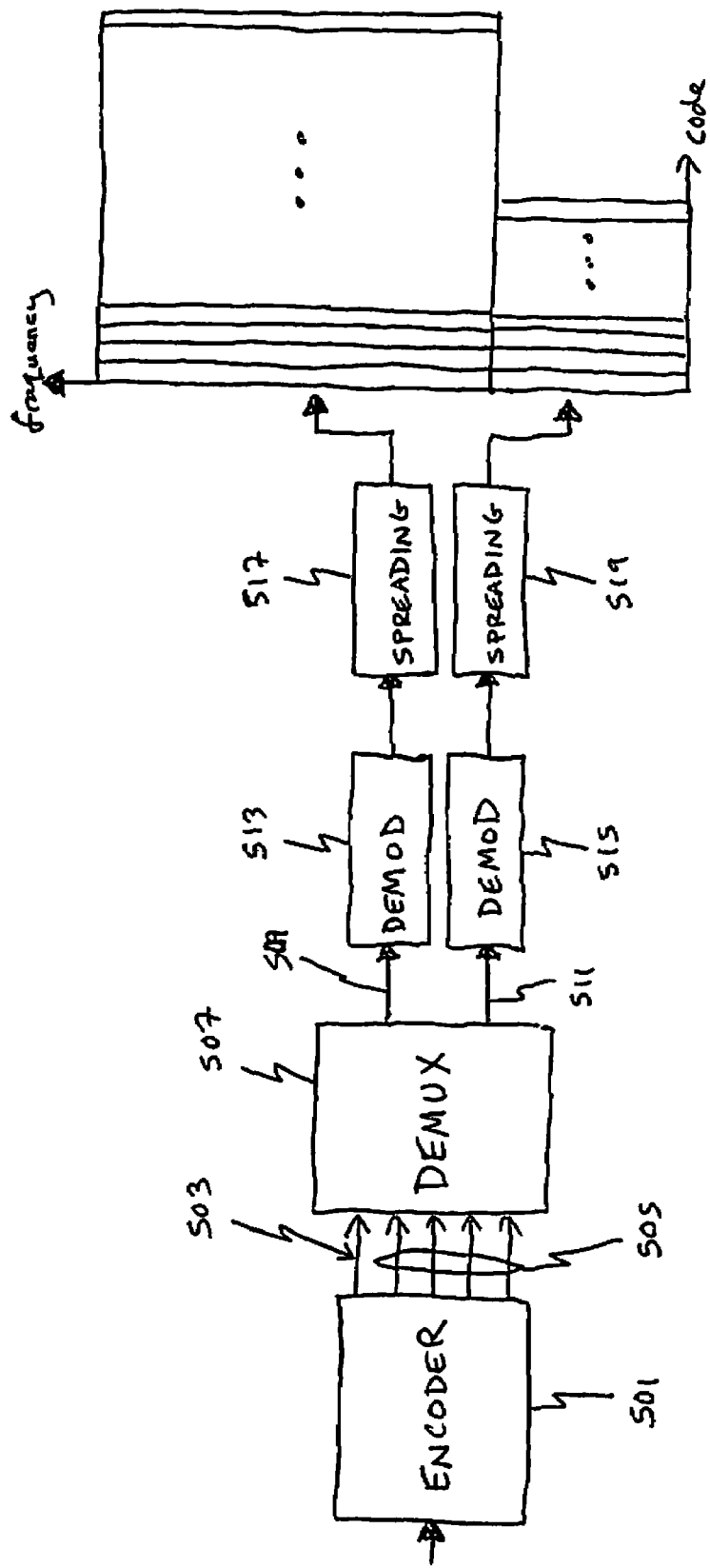
FIG. 5 shows a block diagram of a transmitter according to a further embodiment of the present invention.

FIG. 5 shows how an embodiment in which the present invention is applied to a turbo coding system.

Data is input to a turbo encoder 501. The turbo coder is of the type r=⅓. The systematic bits 503 and redundancy bits 505 are output from the encoder 501 to a de-multiplexer 507. The de-multiplexer 507 uses timing logic (not shown) to apply the systematic bit output 509 to a first modulator 513. Also, the de-multiplexer 507 applies the redundancy bits 505 to a second demodulator 515 in the same manner. The output of the first demodulator 513 is applied to a first spreading circuit 517, which uses a first group of spreading codes. The output of the second demodulator 515 is applied to a second spreading circuit 519, which uses a second group of spreading codes.

A receiver unit (not shown) will also apply the same two groups of spreading codes in order to successfully de-spread and decode the received signals.

Therefore, the systematic bits are spread by a first group of spreading codes and the redundancy bits are spread by a second group of spreading codes. It is more important to successfully transmit and receive the higher priority systematic bits of Turbo code in order to improve the probability of successfully decoding the message. Therefore, the length of the first spreading code applied to the systematic bits is larger than the second spreading code applied to the redundancy bits to increase frequency diversity gain. Therefore, there is an increased chance that the systematic bits will not become corrupted, resulting in a better chance of recovering the transmitted message.

Third Embodiment

Figure 6:
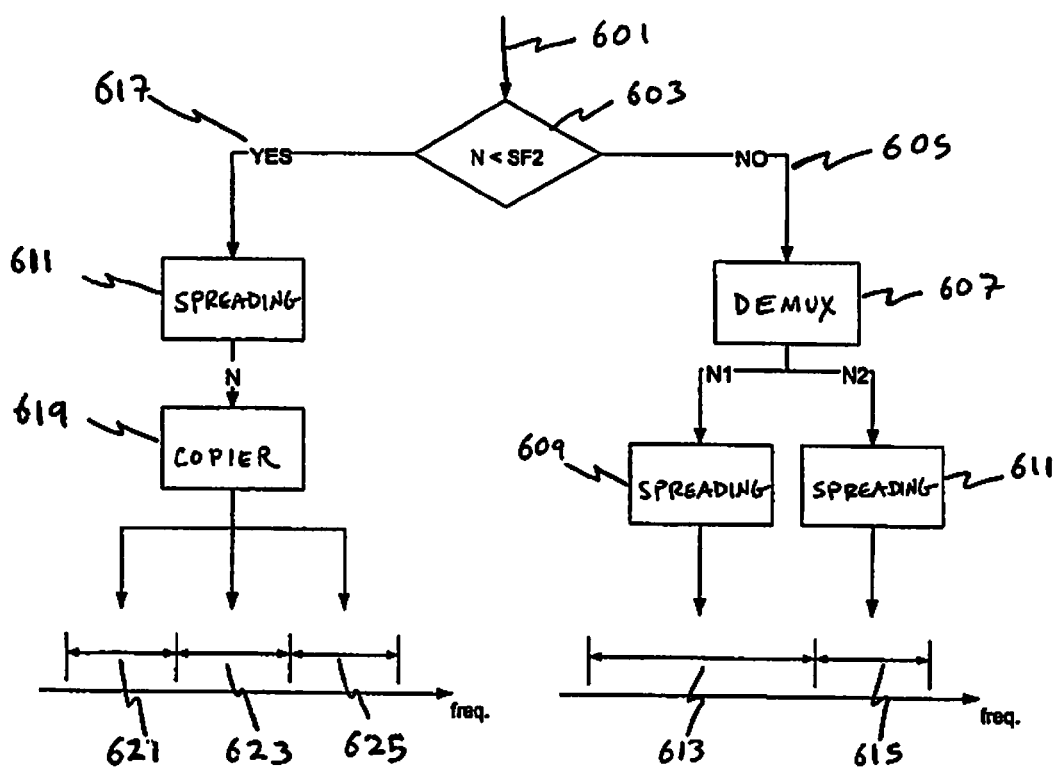
FIG. 6 shows a block diagram of a dynamic spreading concept according to a third embodiment of the present invention.

FIG. 6 shows a dynamic operation between equal and unequal spreading. At the base station, a high rate data stream 601 is monitored by a processor 603 arranged to determine whether N, which represents the number of modulation symbols, is less than the minimum length spreading code 615.

If it is the case that the number of modulation symbols N is not less than the minimum length of the spreading code 615, the high rate data stream 601 is passed down the right hand side channel 605 and is spread in the same manner as that shown in FIG. 2 and its associated description above.

That is, a de-multiplexer 607 has an output that is split into two different channels of different lengths, wherein N=N1+N2. A first spreading code 609 is applied to the data symbols in channel N1. A second spreading code 611 is applied to the data symbols in channel N2. Thus, the first set of data symbols in channel N1 are spread and transmitted over a first range of frequency sub-carriers 613 of one size, and a second set of data symbols in channel N2 is spread and transmitted over a second range of frequency sub-carriers 615 of another size.

If the base station processor 603 determines that the number of modulation symbols N is less than the minimum length of the spreading factor 615, the high rate data stream is passed down the left hand side channel 617. The second spreading code 611 is applied to the data symbols. The copier 619 copies the spread data symbols, and so reproduces duplicates of the spread data symbols. These duplicates are then transmitted over different frequency sub-carriers (621, 623 and 625), all of the same size.

Thus, it is possible to dynamically choose whether unequal spreading should be implemented, such as in the case of many data symbols being transmitted, or whether equal spreading should be implemented when the number of data symbols drops below the length of the minimum spreading factor.

After the base station has determined if the transmission will be based on equal or unequal spreading, the base station then informs the mobile receiver of the decision by way of any suitable known messaging scheme.

A processing unit at the receiver determines whether equal or unequal spreading has occurred by processing the received message from the base station. If the receiver processor determines that unequal spreading has occurred, the method of receiving unequally spread data as previously discussed in relation to FIG. 4 is implemented.

However, if the receiver processor determines that equal spreading has occurred, the received data is de-spread equally using the minimum length spreading code. That is, the output of the FFT is divided into equal portions of the same size as the minimum length spreading code. The code is then applied to each output portion of the FFT. All the de-spread signals are then multiplexed with each other to form the data stream.

Further Embodiments

It will be understood that embodiments of the present invention are described herein by way of example only, and that various changes and modifications may be made without departing from the scope of the invention.

Although the first embodiment shows a first spreading factor of 512 and a second spreading factor of 256, it will be understood that any other possible size of spreading factors could be used.

Also, any number of spreading codes could also be used in order to spread the data over any number of sub carrier frequency groups. The spreading codes could vary for each sub carrier frequency group or, alternatively, certain spreading codes could be repeated for certain sub carrier frequency groups.

Although in the second embodiment it is shown that the systematic bits are assigned to one modulation, while the redundancy bits are assigned to another modulation, it will be understood that a portion of the redundancy bits could also be assigned to the first modulation depending on the system design.

It will be understood that this inventive concept can also be applied to parallel multi-code transmission in CDMA systems.

Also, it will be understood that the invention could be applied to other coding schemes, such as convolutional coding. For example, the tail bits and non-tail bits could be spread using different spreading factors.

Further, it will be understood that the invention could be applied to the simultaneous transmission of signalling and traffic data, wherein the signalling data and traffic data are spread using different spreading factors.

Further, it will be understood that the determination of whether unequal or equal spreading has taken place in the third embodiment may be carried out by any other suitable means. For example, the mobile receiver may determine whether unequal spreading has taken place by monitoring the incoming signal transmitted by the base station.

The invention claimed is:

1. A method of transmitting a signal formed from data symbols over a wireless communication link in a multi carrier code division multiple access (MC-CDMA) communication system, in which the data symbols are spread over multiple sub-carriers in accordance with a code of predetermined length, comprising:
    allocating bandwidth available for use by the system into a plurality of sub carrier frequency groups;
    de-multiplexing the signal into a first set of data symbols to be spread over a first group of sub carrier frequencies;
    de-multiplexing the signal into a second set of data symbols to be spread over a second group of sub carrier frequencies; and
    determining at transmission whether the number of data symbols is less than a minimum length spreading code, and, upon the determination that the number of data symbols is less than the minimum length spreading code, spreading the data symbols over a plurality of equal sub-carrier frequency bands using the minimum length spreading code.

2. The method of claim 1, further comprising applying a first group of spreading codes to the first set of data symbols and applying a second group of spreading codes to the second set of data symbols.

3. The method of claim 2, wherein the first group of spreading codes differs from the second group of spreading codes.

4. The method of claim 1, further comprising arranging further sets of data symbols to be spread over further groups of sub carrier frequencies.

5. The method of claim 1, wherein the first group of sub carrier frequencies covers a different frequency range than the second group of sub carrier frequencies.

6. The method of claim 1, wherein the first group of sub carrier frequencies has a different size bandwidth than the second group of sub carrier frequencies.

7. The method of claim 1, wherein the first and second groups of sub carrier frequencies are directly adjacent to each other.

8. The method of claim 1, wherein the first set of data symbols has a higher priority than the second set of data symbols.

9. The method of claim 8, wherein the data symbols form part of a coding scheme and the first set of data symbols comprises systematic bits and the second set of data symbols comprises redundancy bits.

10. The method of claim 8, wherein the data symbols form part of a convolution coding scheme and the first set of data symbols comprises non-tail bits and the second set of data symbols comprises tail bits.

11. The method of claim 8, wherein the data symbols form part of a simultaneous transmission of signalling and traffic data and the first set of data symbols comprises signalling data and the second set of data symbols comprises traffic data.

12. The method of claim 1, wherein the allocating step and the demultiplexing steps are performed in a transmitter, and wherein the signal is transmitted by the transmitter.

13. A method of receiving a signal formed from data symbols over a wireless communication link in a multi carrier code division multiple access (MC-CDMA) communication system, in which the data symbols are spread over a plurality of carriers in accordance with a code of predetermined length, comprising the steps of:
    dividing the received signal into a plurality of sub carrier frequency groups;
    de-spreading a first group of sub carrier frequencies into a first set of data symbols;
    de-spreading a second group of sub carrier frequencies into a second set of data symbols;
    multiplexing the sets of data symbols to form a data; and
    determining whether equal or unequal spreading has occurred, and, upon the determination that equal spreading has occurred, applying a minimum length spreading code to equal portions of a plurality of sub-carrier frequency bands.

14. The method of claim 13, further comprising de-spreading further groups of sub carrier frequencies into further sets of data symbols, and
    multiplexing the further sets of data symbols with the first and second sets of data symbols to form the data stream.

15. The method of claim 13, further comprising applying a first group of spreading codes to the first group of sub carrier frequencies and applying a second group of spreading codes to the second group of sub carrier frequencies.

16. The method of claim 15, wherein the first group of spreading codes differs from the second group of spreading codes.

17. The method of claim 13, wherein the determination is made at a receiver by looking at the received signal.

18. The method of claim 13, wherein the determination is made at a receiver by receiving a message from a transmitter.

19. The method of claim 13, wherein the first group of sub carrier frequencies covers a different frequency range than the second group of sub carrier frequencies.

20. The method of claim 13, wherein the first group of sub carrier frequencies has a different size bandwidth than the second group of sub carrier frequencies.

21. The method of claim 13, wherein the first and second groups of sub carrier frequencies are directly adjacent to each other.

22. The method of claim 13, wherein the first set of data symbols has a higher priority than the second set of data symbols.

23. The method of claim 22, wherein the data symbols form part of a coding scheme and the first set of data symbols comprises systematic bits and the second set of data symbols comprises redundancy bits.

24. The method of claim 22, wherein the data symbols form part of a convolution coding scheme and the first set of data symbols comprises non-tail bits and the second set of data symbols comprises tail bits.

25. The method of claim 22, wherein the data symbol form part of a simultaneous transmission of signalling and traffic data and the first set of data symbols comprises signalling data and the second set of data symbols comprises traffic data.

26. The method of claim 13, wherein the dividing step, the de-spreading steps, and the multiplexing steps are performed in a receiver, and wherein the signal is received by the receiver.

* * * * *